UNITED STATES PATENT OFFICE.

JOHN W. KIDWELL, OF WASHINGTON, DISTRICT OF COLUMBIA.

NON-CORRODIBLE PLASTIC COMPOSITION.

SPECIFICATION forming part of Letters Patent No. 503,425, dated August 15, 1893.

Application filed October 18, 1892. Serial No. 449,248. (No specimens.)

*To all whom it may concern:*

Be it known that I, JOHN W. KIDWELL, of Washington, in the District of Columbia, have invented a new and useful Improvement in Non-Corrodible Plastic Compositions, which is fully set forth in the following specification.

This invention relates more particularly to the production of a plastic material or compound, which solidifies and hardens into a dense, coherent body, capable of resisting the highest temperatures, non-corrodible by exposure to air or water or to strong acids, and a non-conductor of telluric influences, as heat and electricity. The said material or compound is composed essentially of titanic minerals or natural oxides of titanium, and a hydrocarbon, such as asphalt, with or without other substances that may be added to the essential elements to modify the character of the resulting product for certain specific purposes.

The titanic compounds, which are utilized in carrying out the present invention, are found in the phosphate ore of Nelson county, Virginia, and constitute about seventy per cent. of the ore. The minerals are known as menaccanite, rutile, anatase and brookite, the first mentioned being present in the largest proportion. When the phosphate (apatite) is separated, the mineral residuum, composed of the above substances, is a waste product. In fact practically no industrial application has been made of titanium and its ores prior to this invention. This mineral residuum in the form of powder, when mixed with asphalt, or other suitable hydrocarbon, and with sufficient liquid medium to make a plastic, and then solidified by simple drying, forms a dense, hard, and coherent body, which if not a true chemical combination, is something more than a mechanical mixture, since it will not be affected by nitric and other strong acids, and will withstand a temperature that would cause the asphalt, alone or in other mixtures, such as paving blocks to run and spread.

In order to obtain the best results for certain purposes, it is preferred to heat the mixture gradually up to about 2,500° Fahrenheit driving off the volatile matters, and producing a body that is extremely refractory, and capable of withstanding the temperature of a blast furnace. It is also preferred in making blocks, slabs or other articles of the described material to subject it to compression.

Inasmuch as the ingredients are cheap, the mode of preparation extremely simple, and the material susceptible of being molded into any desired shape, it is obvious that the resulting product may be advantageously employed for fire-bricks, pavements, construction of sewers, electrical insulators, and for a great many other purposes, which will readily suggest themselves to persons familiar with the use to which similar materials or compounds are applied.

In my concurrent application of even date herewith (Serial No. 449,247) I have described and claimed a mineral paint made of the titanic minerals herein described, asphalt and other hydrocarbons being specified as vehicles. The bricks, blocks or materials for buildings, pavements, &c., which form the subject of the present invention, cannot, of course, be confounded with the paint described in said application. In making the paint, when asphalt is used, I employ from thirty-three to fifty per cent. of the asphalt, or sufficient to suspend the mineral. In making a composition for building, and similar purposes, I employ from eighty to ninety per cent. of the mineral and from twenty to ten per cent. of asphalt. These proportions make a "bind," or bring about the strong cohesion herein specified, and the same proportions of mineral and asphalt are used irrespective of other ingredients that may be added.

Other hydrocarbons, such as pitch or coal tar, may be substituted for asphaltum, and they act similarly in forming a strong molecular compound with the mineral; but for many purposes the use of asphaltum is preferred. It will be understood therefore that in specifying asphalt as one of the essential ingredients of the claim, it is intended to include other hydrocarbons which may be substituted therefor, and are the equivalents thereof, for the purposes of this invention.

I claim as my invention—

The described composition of matter for building-blocks and similar purposes composed of the specified titanic minerals, and asphaltum, containing about eight parts of the former to two parts of the latter, substantially as described.

In testimony whereof I have signed this specification in the presence of two subscribing witnesses.

JOHN W. KIDWELL.

Witnesses:
PHILIP MAURO,
REEVE LEWIS.